Aug. 29, 1967  R. E. DAVY  3,338,281
NUT CRACKER FOR MACADAMIA AND OTHER NUTS
Filed March 25, 1965
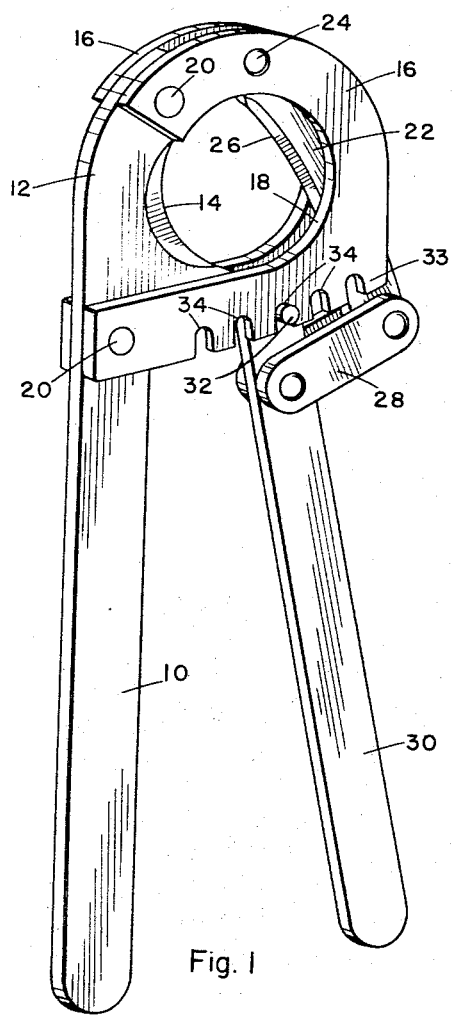
Fig. 1
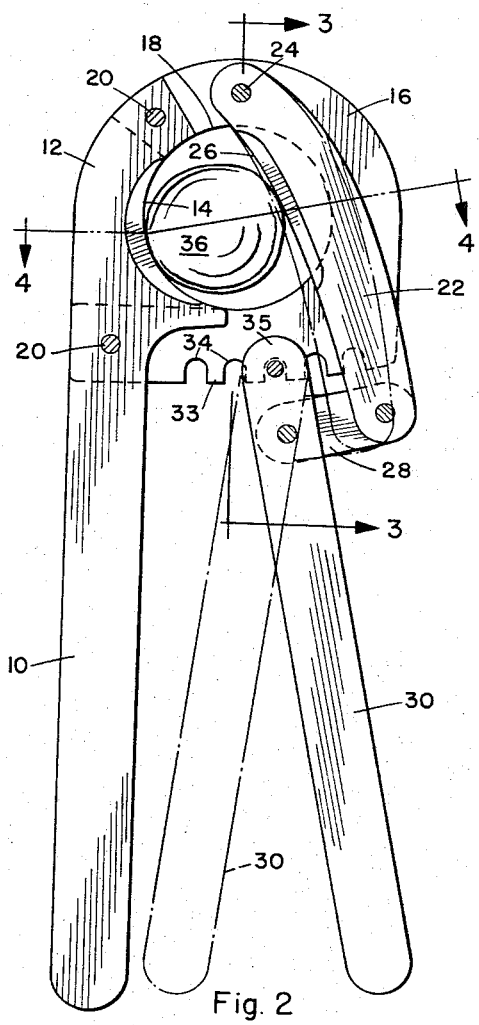
Fig. 2
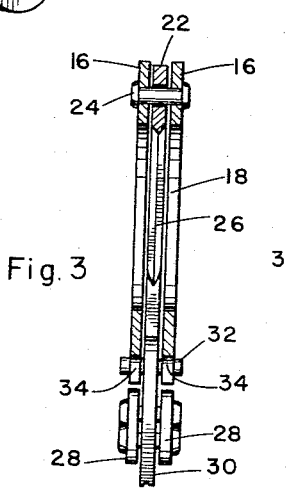
Fig. 3
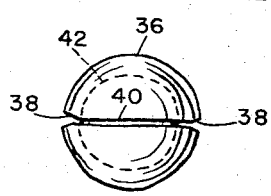
Fig. 5
Fig. 4
INVENTOR.
ROBERT E. DAVY
BY
Knox & Knox

United States Patent Office 3,338,281
Patented Aug. 29, 1967

3,338,281
NUT CRACKER FOR MACADAMIA AND
OTHER NUTS
Robert E. Davy, La Mesa, Calif., assignor to
Coroga Co., Anaheim, Calif.
Filed Mar. 25, 1965, Ser. No. 442,585
5 Claims. (Cl. 146—13)

ABSTRACT OF THE DISCLOSURE

This nut cracker combines wide adjustability of the splitting blade with a strictly limited travel at all settings of the splitting or crushing of the kernel or meat of such nuts as macadamia and other hard shelled nuts. The operating handle is linked to, rather than integral with, the splitting blade and the handle is stabilized against side sway by dual fulcrum pins selectively inserted in notches, these notches being arranged in an arc centered on the pivot point of the cutting blade to standardize the travel of the cutting blade.

The present invention relates to a nut cracker for macadamia and other nuts.

Most nut crackers, especially the hand held types, have no means for limiting their closing and very often the nuts are crushed to the extent that the meat is broken into small pieces. This is especially true with macadamia nuts and others having thick or tough shells which require considerable pressure to break. With presently available nut crackers, once the shell starts to fracture, total collapse is very rapid and it is difficult to release the hand pressure before the nut is shattered.

The primary object of this invention is to provide a nut cracker which opens a nut by splitting the shell neatly and easily, due to a high lever advantage with a controlled and limited stroke, which prevents damage to the nut meat.

Another object of this invention is to provide a nut cracker which is readily adjustable to accept all sizes of nuts, while maintaining the same controlled closing stroke for each size of nut.

Another object of this invention is to provide a nut cracker in which a nut is securely held in a circumferentially enclosed opening and will not slip out when pressure is applied.

A further object of this invention is to provide a nut cracker which is very simple to make and which can be comfortably used with one hand.

In the drawings:

FIGURE 1 is a perspective view of the nut cracker;

FIGURE 2 is a side elevation view thereof, with one side of the nut holding frame removed to reveal the mechanism;

FIGURE 3 is a sectional view taken on line 3—3 of FIGURE 2;

FIGURE 4 is a sectional view taken on line 4—4 of FIGURE 2; and

FIGURE 5 is a view of a nut illustrating the manner in which the shell is opened by the nut cracker.

Similar characters of reference indicate similar or identical elements and portions throughout the specification and throughout the views of the drawing.

The nut cracker comprises an elongated handle 10 at one end of which is a back-up yoke 12 having a concave knife edge 14. Fixed to opposite sides of the yoke 12 are substantially arcuate side frames 16, the inner edges thereof defining, together with the knife edge 14, a generally circular opening 18 to receive a nut. Rivets 20 or similar securing means can be used to hold the side frames and handle securely together, with the side frames in closely spaced parallel relation separated by the thickness of said handle. Mounted between the side frames 16 is a splitting blade 22 attached to an end thereof remote from the handle 10 by a hinge pin 24 extending through the correspoding portions of the frames, the blade having a slightly concave knife edge 26 directly opposed to knife edge 14, as in FIGURE 4, and held in co-planar alignment with said knife edge 14 by said side frames. The other end of splitting blade 22 extends beyond the side frames 16 and is pivotally connected by toggle links 28 to a hand lever 30 at a short distance below a fulcrum pin 32 fixed through the upper end of said hand lever and projecting on both sides thereof. A dual rack 33 is formed along the edges of side frames 16 adjacent the proximal end 35 of the hand lever 30, this rack being defined by aligned pairs of notches 34 into which the fulcrum pin 32 can be selectively seated with the proximal end of the hand lever 30 inserted between the adjacent portions of the side frames. Notches 34 may be disposed along an arc centered approximately on hinge pin 24, so that the stroke is similar at all settings. The dual rack imparts considerable stability against side sway of the hand lever during operation.

A nut 36 to be cracked is placed in the opening 18, as indicated in FIGURE 2, and fulcrum pin 32 is inserted into the appropriate pair of notches 34 so that, when the nut is initially gripped between knife edges 14 and 26, the hand lever 30 and handle 10 are separated by the proper distance for a comfortable grip in one hand. When handle 10 and hand lever 30 are squeezed together, the large lever advantage applies considerable pressure to the nut 36 and both the knife edges 14 and 26 penetrate the nut from opposite sides. The knife edges need not be particularly sharp since a clean cutting action is not desirable, the penetration of the knife edges making wedge-like openings on opposite sides of the nut, as indicated at 38 in FIGURE 5. The resultant strain causes the nut to split circumferentially as at 40, with the two shell halves forced apart rather than cut. Due to the very limited stroke of the splitting blade 22, indicated in broken line position in FIGURE 2, the penetration of the knife blades stops at the shell and the nut meat 42 is undamaged.

The action has been found particularly effective on macadamia nuts which have thick tough shells, the strain imposed by the opposed wedging of the blades causing these shells to pop apart. Many types of nuts will open in the same manner. With brittle shell nuts such as walnuts, or unevenly shaped types such as brazil nuts, the nuts can be rotated to two or more different positions and squeezed between the blades until the circumferential separation is complete. In actual practice the operation is quickly and easily accomplished with one handed use of the nut cracker which, when properly adjusted to the nut, cannot crush the nut meat because of the limited stroke.

With the fulcrum pin 32 in the pair of notches 34 nearest the handle 10, the smallest filberts or similar nuts can be handled, while the notches furthest from the handle allow the splitting blade to be set out to accommodate the largest normally available nuts. The opposed knife edges are held in their co-planar relationship since the splitting blade slides between the side frames and said edges grip the nut squarely and prevent the nut from being ejected by unbalanced or offset pressures. Since the knife blades are not sharp enough for actually cutting the nut, the nut cracker is safe to use and, even at the smallest setting, will not close completely enough to crush a child's finger between the blades.

While the frame and handle assembly is illustrated as made from sheet metal parts riveted together, it will be obvious that this portion could be a unitary casting or forging. However, the arrangement illustrated can be made entirely from stamped sheet metal parts, except for fastenings and pivot pins, and is very economical to manufacture.

It is understood that minor variation from the form of the invention disclosed herein may be made without departure from the spirit and scope of the invention, and that the specification and drawings are to be considered as merely illustrative rather than limiting.

I claim:
1. A nutcracker, comprising:
   a frame having a handle thereon;
   said frame having a nut receiving opening therein;
   a splitting blade pivotally attached at one end to said frame at a point adjacent one side of said opening to swing partially across said opening;
   said splitting blade and a portion of said frame at the periphery of said opening having opposed, substantially co-planar nut penetrating edges;
   a hand lever having a proximal end selectively pivotally engaged with said frame at a plurality of fulcrum positions arranged substantially in an arc centered on said point, and a free, distal end portion in opposed relation to said handle, an intermediate portion of said hand lever being operatively connected to said splitting blade.

2. A nutcracker, comprising:
   a frame having a handle thereon;
   said frame having a nut receiving opening therein;
   a splitting blade pivotally attached to one end to said frame to swing partially across said opening;
   said splitting blade and a portion of said frame at the periphery of said opening having opposed, substantially co-planar nut penetrating edges;
   a hand lever having a proximal end adjustably pivotally engaged with said frame and a free, distal end portion in opposed relation to said handle, an intermediate portion of said hand lever being operatively connected to said splitting blade;
   said frame having a rack in which said proximal end is selectively pivotally inserted in a plurality of positions successively spaced from said handle.

3. A nutcracker according to claim 2 wherein said rack is dual with one portion thereof on each side of said proximal end of the hand lever, thus imparting stability to the hand lever against side sway.

4. A nutcracker, comprising:
   a handle;
   a frame portion at one end of said handle extending on one side thereof;
   said frame having a nut receiving opening therein;
   a splitting blade pivotally attached to said frame to swing partially across said opening;
   said splitting blade and a portion of said frame at the periphery of said opening having opposed, substantially co-planar nut penetrating edges;
   an edge of said frame extending generally transversely of said handle and having notches therein spaced successively from the handle;
   a hand lever having fulcrum means at the end thereof proximal to said frame selectively engageable in said notches;
   and toggle links pivotally interconnecting on intermediate portions of said hand lever with said splitting blade.

5. A nutcracker, comprising:
   a handle;
   a frame portion at one end of said handle extending on one side thereof;
   said frame having a nut receiving opening therein;
   a splitting blade pivotally attached to said frame to swing partially across said opening;
   said splitting blade and a portion of said frame at the periphery of said opening having opposed, substantially co-planar nut penetrating edges;
   the outer edge of said frame extending outwardly from said handle having notches spaced successively from the handle;
   a hand lever having an end proximal to said frame selectively engageable in said notches;
   and linkage means pivotally interconnecting said hand lever with said splitting blade;
   said frame including side frames fixed on opposite sides of said handle in spaced parallel relation, said splitting blade being mounted between said side frames and pivotally attached thereto on the side remote from said handle.

References Cited

UNITED STATES PATENTS

| 416,500 | 12/1889 | Robbins | 30—190 X |
| 1,319,946 | 10/1919 | Bessolo | 30—190 X |
| 2,758,622 | 8/1956 | Greenblatt | 146—13 |

FOREIGN PATENTS

| 51,919 | 3/1911 | Switzerland. |

WILLIAM W. DYER, Jr., *Primary Examiner.*

W. GRAYDON ABERCROMBIE, *Examiner.*

UNITED STATES PATENT OFFICE
CERTIFICATE OF CORRECTION

Patent No. 3,338,281                          August 29, 1967

Robert E. Davy

It is hereby certified that error appears in the above numbered patent requiring correction and that the said Letters Patent should read as corrected below.

Column 2, line 4, for "to" read -- at --; column 4, line 13, for "on" read -- an --.

Signed and sealed this 20th day of August 1968.

(SEAL)
Attest:

Edward M. Fletcher, Jr.
Attesting Officer

EDWARD J. BRENNER
Commissioner of Patents